United States Patent [19]

Meyn

[11] Patent Number: 5,074,823

[45] Date of Patent: Dec. 24, 1991

[54] APPARATUS FOR IMPARTING A SIMULTANEOUS ROTATIONAL MOVEMENT TO AN OBJECT MOVING ALONG A RECTILINEAR TRAJECTORY

[75] Inventor: Cornelis Meyn, Oostzaan, Netherlands

[73] Assignee: Machinefabriek Meyn B.V., Oostzaan, Netherlands

[21] Appl. No.: 497,862

[22] Filed: Mar. 22, 1990

[30] Foreign Application Priority Data

Feb. 23, 1990 [NL] Netherlands .................. 9000436

[51] Int. Cl.⁵ .................. A22C 21/00; F16H 27/02
[52] U.S. Cl. .................. 452/106; 456/117; 74/89
[58] Field of Search .......... 452/106, 109, 117, 118, 452/122, 179; 74/25, 22 R, 22 A, 88, 89.14, 99 R, 99 A, 89

[56] References Cited

U.S. PATENT DOCUMENTS

| | | | |
|---|---|---|---|
| 2,152,518 | 3/1939 | Wolff | 74/89 |
| 2,281,866 | 5/1942 | Williams | 74/89 |
| 4,040,682 | 8/1977 | Poulsen | 74/25 |
| 4,117,570 | 10/1978 | Meyn | 452/122 |

Primary Examiner—Willis Little
Attorney, Agent, or Firm—Dority & Manning

[57] ABSTRACT

An apparatus for imparting a simultaneous rotational movement to an object moving along a rectilinear trajectory a slide block can be moved to and fro along a substantially cylindrical rod that has at least one flattened surface that is engaged by a guide wheel journalled in the slide surface block. The flattened surface extends partially rectilinearly and partially spirally along the cylindrical rod.

7 Claims, 1 Drawing Sheet

5,074,823

APPARATUS FOR IMPARTING A SIMULTANEOUS ROTATIONAL MOVEMENT TO AN OBJECT MOVING ALONG A RECTILINEAR TRAJECTORY

BACKGROUND OF THE INVENTION

The invention relates to an apparatus for imparting a simultaneous rotational movement to an object moving along a rectilinear trajectory, with a straight guide. This apparatus comprises a partially spiral guide trajectory and a slide that is positioned around the guide, that is movable to and from relative thereto. The slide is provided with a follower which engages the guide trajectory for rotating the slide about the guide in the region of the spiral guide trajectory.

A known apparatus of the type referred to above, is often used in machines that perform a special operation. An example of such a machine is an apparatus for removing the craw of slaughtered poultry. In such an apparatus a mandril with projections is moved through the abdominal cavity and the neck of the slaughtered poultry to remove the craw. During at least part of its motion the mandril rotates about its own axis to optimize its function. Therefore, the mandril simultaneously carries out a rectilinear movement along its central axis as well as a rotational movement about the central axis.

For achieving this rotational movement of the mandril, which is connected to the slide, the guide is provided with at least a partially spiral groove which engages a pin attached to the slide. If the slide is moved along the guide the pin will, first run through a straight groove section such that the slide will not rotate. After reaching the spiral groove section however, the slide will, apart from its rectilinear movement, also carry out a rotational movement.

A disadvantage of the known apparatus is that the cooperation between the pin and the groove results in a high friction and, therefore, leads to excessive wear of the respective parts. Moreover, the high friction requires a high driving power of the apparatus and, thus, heavy and expensive motors.

SUMMARY OF THE INVENTION

It is an object of the invention to provide an apparatus of the type referred to above in which the above mentioned disadvantages are removed in simple but, nevertheless, effective way.

The apparatus according to the invention is characterized in that the guide comprises a substantially cylindrical rod, whereas the guide trajectory is defined by a flattening of the rod and wherein the follower means consists of a guide wheel journaled in the slide and engaging the flattening of the cylindrical rod.

The guide wheel, journaled in the slide, carries out a rolling motion over the flattening of the cylindrical rod, as a result of which the resulting friction is low. The cooperation between the flattening and the guide wheel, however, enables the slide to obtain the desired rotational movement.

According to a preferred embodiment of the apparatus according to the invention, the cylindrical rod is provided with two flattened surfaces with two corresponding guide wheels journaled in the slide. This embodiment is still further optimized if the two flattened surfaces are positioned diametrically opposite each other. In this way the forces acting on the slide are symmetrical so that the resulting friction, and, therefore, the wear, are still further decreased.

In a simple embodiment of the apparatus according to the invention the guide wheel axis lies in a plane which intersects the longitudinal axis of the cylindrical rod at a right angle. This embodiment is characterized by a simple constructive design which reduces the costs of the apparatus. It is possible, however, for the guide wheel axis plane to intersect the longitudinal axis of the cylindrical rod at an acute angle. Among others, this angle can be dependent on the chosen pitch of the spiral guide trajectory. By an adequate choice of this angle, one may obtain the cooperation between the flattened surface of the cylindrical rod and the guide wheel engaging it, as advantageous as possible, in a region of the straight guide trajectory section as well as at the region of the spiral guide trajectory section.

BRIEF DESCRIPTION OF THE DRAWINGS

Hereinafter the invention will be elucidated further by means of the drawings, in which an embodiment of the apparatus according to the invention is illustrated.

DETAILED DESCRIPTION OF THE INVENTION

Figure 1:
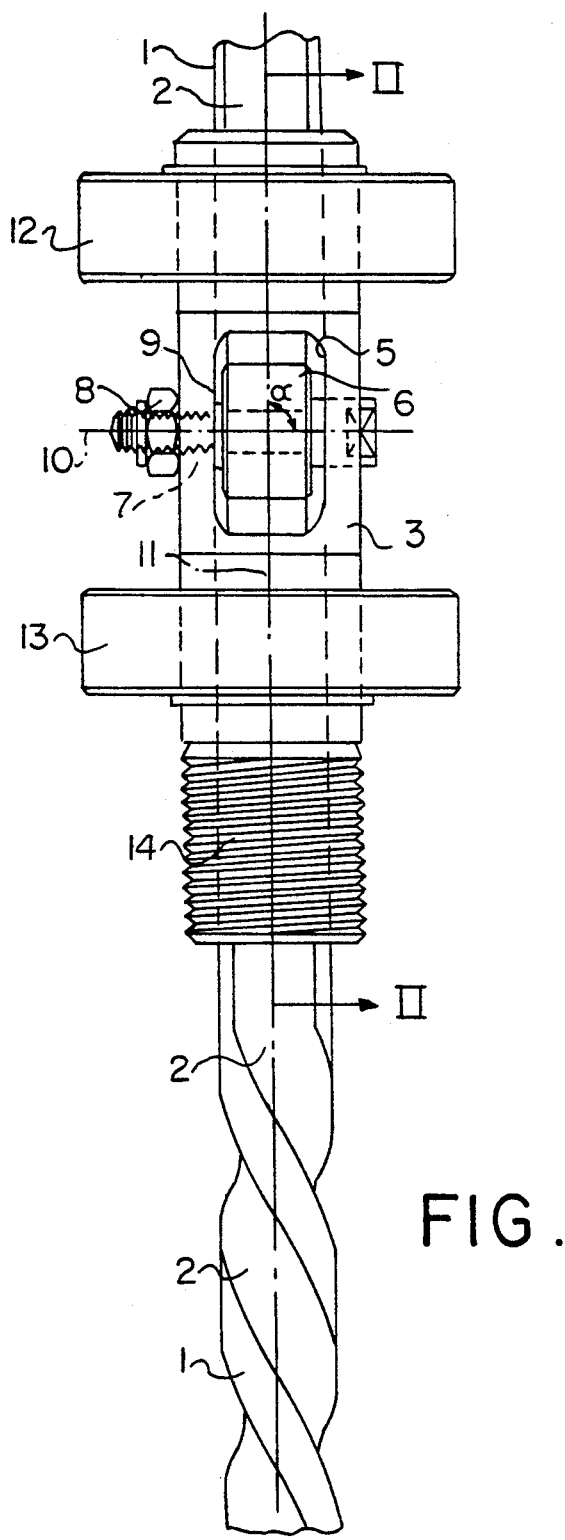
FIG. 1 is a plane view of an embodiment of the apparatus according to the invention.

The apparatus represented in FIG. 1 for imparting a simultaneous rotational movement to an object moving along a rectilinear trajectory first is provided with a straight guide 1. Straight guide 1 is shaped as a cylindrical rod having two diametrically opposed flattened surfaces 2. over at least a part of the length of the straight guide 1 the flattened surfaces 2 extend spirally. This part of the straight guide 1 is shown in the lowermost section of FIG. 1. In the uppermost section of FIG. 1 the straight guide 1 doesn't have such a spiral shape. Further, it can be seen that the spiral section of the straight guide 1 is gradually transformed into the non-spiral shaped section.

A slide block 3 is positioned around the guide rod 1. This slide 3 is provided with an axial bore 4, having a diameter that substantially corresponds with the maximum diameter of the straight guide rod 1. Thus, the slide block 3 can move to and fro along the straight guide 1 in its longitudinal direction. During a to and fro movement of the slide 3 the central axis of the slide 3 will constantly coincide with the central axis of the straight guide 1.

In the slide 3 two recesses 5 joining the bore 4 are formed. In each recess 5 a guide wheel 6 is journaled in the slide 3 by means of a pin 7. Pin 7 is fastened by means of a nut 8. Further, for correct positioning of the guide wheel 6, a washer 9 is applied between guide wheel 6 and the slide 3.

Figure 2:
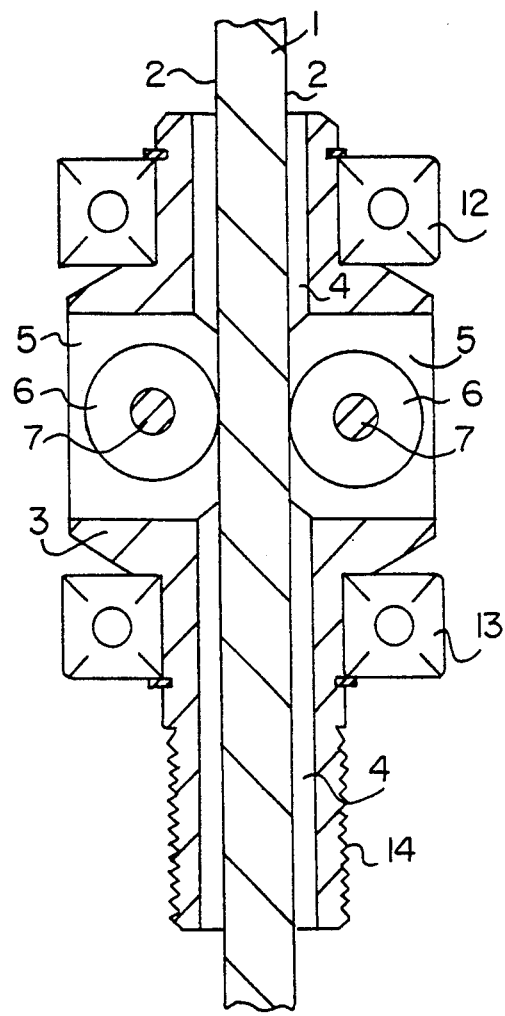
FIG. 2 is a sectional view taken along line II—II in FIG. 1.

As appears clearly from FIG. 2 both guide wheels 6 engage the surfaces of the flattened surfaces 2 of the straight guide 1. Guide wheels 6 do not obstruct the to and from movement of the slide 3 in the longitudinal direction of the straight guide 1, but obviate that the slide 3 will, in an uncontrolled way, rotate relative to the straight guide rod 1.

If the slide runs through the upper section of the straight guide 1 as shown in FIG. 1, where the flattened surfaces 2 do not yet have a spiral shape, the slide 3 will only carry out a translational movement relative to the straight guide. When the spiral section of the straight guide rod 1 is reached the guide wheels 6 will follow the flattened surfaces 2 so that the slide block 3 will, during its continuing translational movement, rotate relative to the straight guide rod 1 in correspondence with this spiral shape. Thus, in the region of the spiral guide section the slide obtains simultaneously a translational movement and a rotational movement.

In the shown embodiment of the apparatus the angle $\alpha$ at which the transverse phase of axes 10 of the guide wheels 6 intersects the longitudinal axis 11 of the straight guide 1 is 90°. It is possible however that this angle $\alpha$ is smaller than 90°. Such an angle $\alpha$ differing from 90° can take into account the pitch angle of the spiral flattened surfaces 2 in the spiral region of the straight guide rod 1.

In operation, the slide block 3 is moved to and fro in the longitudinal direction of the straight guide 1 by a driving mechanism not shown. The connection between the slide 3 and such a driving mechanism should take account for the rotation of the slide 3 occurring. In the illustrated embodiment of the apparatus this is achieved by the provision of ball-bearings 12, 13 that enable the rotation of the slide 3 relative to a driving mechanism connected therewith. In a way, known per se, the driving mechanism could comprise a curved track and a follower roll cooperating therewith. However, still other solutions are possible.

At its lower side the slide block 3 is provided with a threaded end 14. A not illustrated processing device, that has to be driven by the shown apparatus, can be mounted thereon. Such a processing device can, for example, consist of a mandril having projections for removing the craw of slaughtered poultry. By means of the illustrated apparatus the mandril is first positioned into a body cavity of the poultry without any rotational movement, and just after reaching a certain depth it will also start to rotate. In this case the mandril is at least partially hollow, such that it can receive the section of the straight guide 1 extending beneath the slide 3.

As mentioned before it is possible that the guide wheels 6 are positioned at a different angle relative to the straight guide 1. Further the possibility remains to provide only one guide wheel instead of two guide wheels 6. In such a case, the straight guide 1 only comprises one flattened surface 2. However, in such a case asymmetrical loads are applied to the slide 3 which generally will lead to more friction and a faster wear.

The invention is not restricted to the embodiment described above and can be varied widely within the scope of the invention.

We claim:

1. Apparatus for guiding an object for rotational and rectilinear movement, comprising:
    (a) an elongated slide block having an elongated cylindrical opening extending through said slide block;
    (b) a rigid guide rod extending through said cylindrical opening, having at least one flattened surface extending along the surface of a first section of said guide rod parallel to the longitudinal axis of said guide rod and at an angle to said longitudinal axis along a second section of said guide rod;
    (c) bearing means to support said slide block for rectilinear movement along said guide rod and for rotational movement about said guide rod; and
    (d) means on said slide block for supporting at least one guide wheel for rolling contact with said flattened surface on said guide rod, whereby rectilinear movement of said slide block along said guide rod will cause said slide block to move in a rectilinear path along said first section of said guide rod and in a rotational and rectilinear path along said second section of said guide rod.

2. Apparatus as set forth in claim 1, wherein said guide rod has two symmetrically disposed flattened surfaces and said slide block has means for supporting two guide wheels for rolling contact with said flattened surfaces.

3. Apparatus as set forth in claim 2, wherein said two flattened surfaces are disposed diametrically opposite to each other.

4. Apparatus as set forth in claim 1, wherein said guide wheel axis lies in a plane which intersects the longitudinal axis of said guide rod at a right angle.

5. Apparatus as set forth in claim 1, wherein said guide wheel axis lies in a plane which intersects the longitudinal axis of said guide rod at an acute angle.

6. Apparatus as set forth in claim 1, wherein said means on said slide block for supporting said guide wheel comprises an opening transverse of said elongated cylindrical opening and said guide wheel is supported within said transverse opening.

7. Apparatus as set forth in claim 1, wherein said slide block has means for supporting a mandrill for removing the craw of slaughtered poultry.

* * * * *